United States Patent
Yang et al.

(10) Patent No.: US 8,483,453 B2
(45) Date of Patent: Jul. 9, 2013

(54) VEHICLE APPARATUS CONTROL SYSTEM AND METHOD THEREOF

(75) Inventors: Tai-Chang Yang, Hsinchu (TW); Yin-Pin Chang, Hsinchu (TW); Wen-Yan Chang, Hsinchu (TW); Hong-Long Chou, Hsinchu (TW)

(73) Assignee: Altek Corporation, Hsinchu (TW)

( * ) Notice: Subject to any disclaimer, the term of this patent is extended or adjusted under 35 U.S.C. 154(b) by 202 days.

(21) Appl. No.: 13/074,557

(22) Filed: Mar. 29, 2011

(65) Prior Publication Data

US 2012/0170817 A1 Jul. 5, 2012

(30) Foreign Application Priority Data

Dec. 31, 2010 (TW) ................................ 99147420 A

(51) Int. Cl.
*G06K 9/00* (2006.01)
(52) U.S. Cl.
USPC ........................................................ 382/118
(58) Field of Classification Search
None
See application file for complete search history.

(56) References Cited

U.S. PATENT DOCUMENTS

| 2008/0069403 | A1* | 3/2008 | Breed | 382/104 |
| 2010/0071003 | A1* | 3/2010 | Bychkov et al. | 725/46 |
| 2012/0158203 | A1* | 6/2012 | Feldstein | 700/295 |

* cited by examiner

*Primary Examiner* — Claire X Wang
*Assistant Examiner* — Thomas A James
(74) *Attorney, Agent, or Firm* — WPAT, P.C.; Anthony King

(57) ABSTRACT

A vehicle apparatus control system and method thereof are disclosed. The vehicle apparatus control system comprises a data storage module, an image capturing module, a face recognition module and a control module. The data storage module stores multiple registered users' facial feature parameters and vehicle apparatus setting parameters, and integration setting data. The face recognition module detects several facial images contained in the captured image and recognizes the users corresponding to the face images according to the facial feature parameters stored in data storage module. The control module set a vehicle apparatus according to the integration setting data, and the corresponding users' vehicle apparatus setting parameters.

2 Claims, 5 Drawing Sheets

VEHICLE APPARATUS CONTROL SYSTEM AND METHOD THEREOF

FIELD OF THE INVENTION

The exemplary embodiment(s) of the present invention relates to a vehicle apparatus control system and the method thereof. More specifically, the exemplary embodiment(s) of the present invention relates to a vehicle apparatus control system and the method using the face recognition technology and integrates the multi-user setting function.

BACKGROUND OF THE INVENTION

Presently, the intelligent central control setting is the common vehicle apparatus and is also the major adverting appeal of the high level vehicle for consumers. However, various function recording menus of the present central control system of the vehicle has not achieved the standard of customization and still uses the shared setting with other users. In addition, users still have to use the key to set up the intelligent central control setting, which is not convenient for use.

Moreover, although the face recognition technology has been commonly used in camera control and identity recognition, it hasn't been commonly used in vehicle.

SUMMARY

A primary object of the present invention is to provide a vehicle apparatus control system and the method thereof to enhance the user's comfort in the vehicle.

According to an object of the present invention, a vehicle apparatus control system used to control at least one vehicle apparatus of the vehicle is disclosed, comprising a data storage module, at least one image capturing module, a face recognition module, and a control module. The data storage module saves a plurality of facial feature parameters of a plurality of users, a vehicle apparatus setting parameter and an integration setting data. The image capturing module captures an image in the vehicle. The face recognition module detects a plurality of facial images of the image and recognizes the plurality of users corresponded to the facial images based on the plurality of facial feature parameters. The control module sets the vehicle apparatus based on the vehicle apparatus setting parameters corresponded to the plurality of users and the integration setting data.

In the present invention, the vehicle apparatus comprises an audio playback device or an air condition device.

In the present invention, the vehicle apparatus setting parameter comprises a record of the preferred audio content of the user, and the integration setting data comprises priority information. The control module decides a playback setting parameter to set up the audio playback device based on the priority information and a plurality of vehicle apparatus setting parameters of the user.

In the present invention, the vehicle apparatus setting parameter comprises a view class, and the integration setting data comprises priority information. The control module sieves content of multimedia played by the audio playback device based on the priority information and a plurality of view classes of the user.

In the present invention, the vehicle apparatus setting parameter comprises a preferred temperature record of the user, and the integration setting data comprises user weighted information. The control module decides a temperature setting parameter to set up the air condition device based on the user weighted information and a plurality of the preferred temperature records of the user.

According to an object of the present invention, a vehicle apparatus control system method used to control at least one vehicle apparatus of the vehicle is also disclosed, comprising the following steps: providing a plurality of facial feature parameters of a plurality of users, a vehicle apparatus setting parameter and an integration setting data; capturing an image in the vehicle; detecting a plurality of facial images from the image and recognizing the plurality of users corresponding to the facial images based on the plurality of facial feature parameters; setting up the vehicle apparatus based on the vehicle apparatus setting parameters corresponding to the plurality of users and the integration setting data.

In the present invention, the vehicle apparatus comprises an audio playback device or an air condition device.

In the present invention, the vehicle apparatus setting parameter comprises a record of the preferred audio content of the user, and the integration setting data comprises priority information. The control module decides a playback setting parameter to set up the audio playback device based on the priority information and a plurality of vehicle apparatus setting parameters of the user.

In the present invention, the vehicle apparatus setting parameter comprises a view class, and the integration setting data comprises priority information. The control module sieves content of multimedia played by the audio playback device based on the priority information and a plurality of view classes of the user.

In the present invention, the vehicle apparatus setting parameter comprises a preferred temperature record of the user, and the integration setting data comprises user weighted information. The control module decides a temperature setting parameter to set up the air condition device based on the user weighted information and a plurality of the preferred temperature records of the user.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
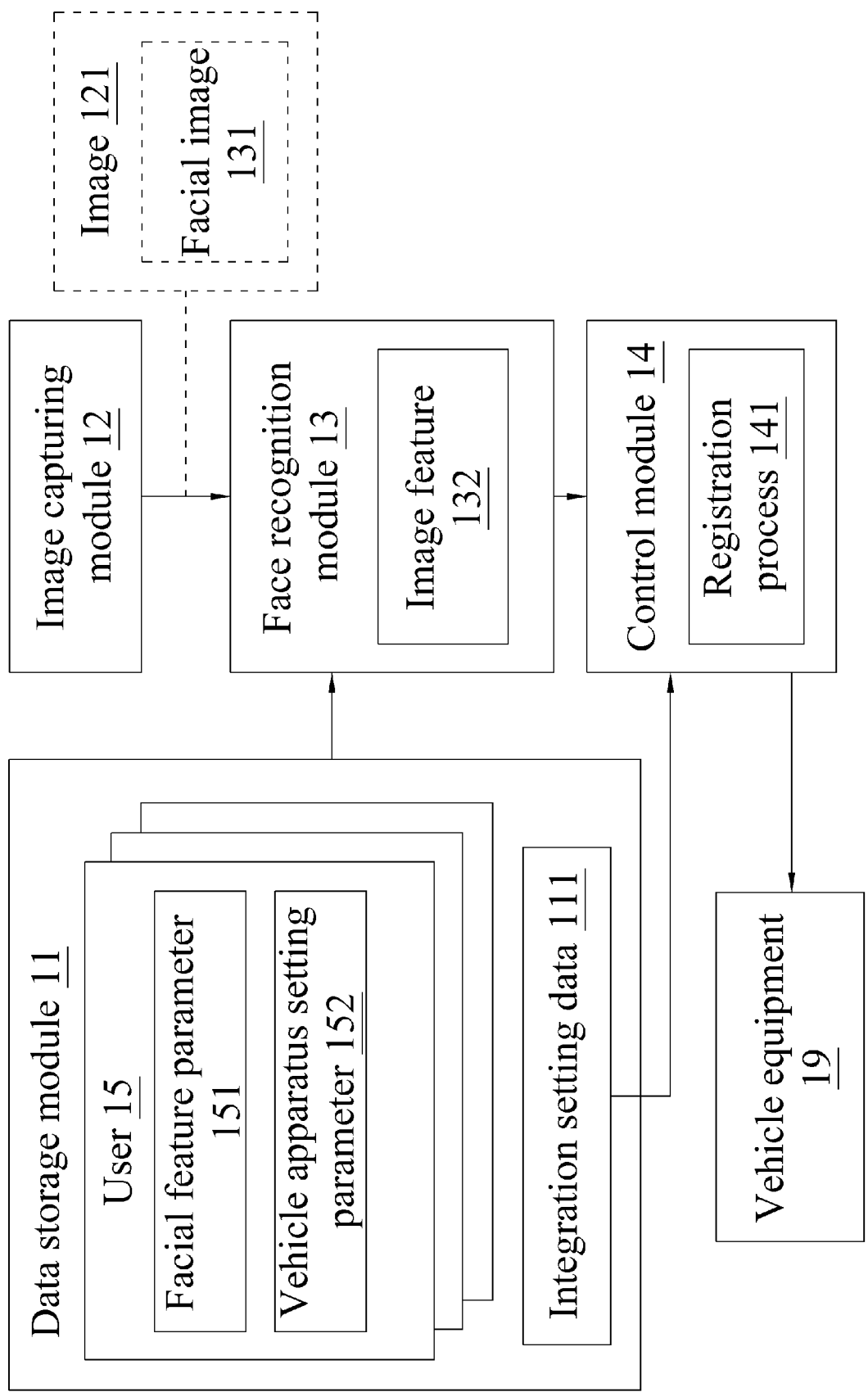
FIG. 1 is the first block diagram of a vehicle apparatus control system according to an embodiment of the present invention.

The present invention will now be described with some preferred embodiments thereof and with reference to the accompanying drawings. For the purpose of being easy to Please refer to FIG. 1 that is the first block diagram of a vehicle apparatus control system according to an embodiment of the present invention. As shown, the vehicle apparatus control system, which is used to control at least one vehicle apparatus 19 of a vehicle, comprises a data storage module 11, at least one image capturing module 12, a face recognition module 13, and a control module 14. The data storage module 11 saves facial feature parameters 151 of a plurality of users 15 registered in the vehicle apparatus control system, a vehicle apparatus setting parameter 152, and an integration setting data 111. Ideally, the data storage module 11 can be a hard drive, an optical storage media, a flash memory or other non-volatile memory. The image capturing module 12 is used to capture an image in the vehicle. In addition, the image capturing module 12 is an image sensor such as a charge-coupled device (CCD) or a complementary metal-oxide-semiconductor (CMOS). The number of image capturing module 12 can be one or more upon the demand In fact, the image capturing module 12 can be set to shoot all of the seats in the vehicle, or set separately with each seat to capture the image.

The face recognition module 13 recognizes a plurality of facial images 131 from the image 121, extracts the image feature 132 of the facial images 131, and then compares the image feature 132 and a plurality of facial feature parameters 151 saved in the data storage module 11 in order to recognize whether if a plurality of facial images 131 are facial images of a plurality of users 15 registered in the vehicle apparatus control system. Additionally, as the facial feature parameters and the technology of extracting image feature and recognizing facial image mentioned above is familiar to the technical workers of this field, it will not be explained again.

The facial feature parameters 151 of the user 15 registered in the vehicle apparatus control system can be a built-in data. Or while face recognition module 13 detects that there is a user not registered in the image 121, the control module 14 executes a registration process 141 to set the image feature 132 as the facial feature parameters of the new user and save in the storage module 11. Therefore, the new user can be recognized as the registered user. The registered process 141 above can be operated automatically by the vehicle apparatus control system or manually by the user.

If the face recognition module 13 determines that there is a registered user 15 in the image 121, the control module 14 sets up the vehicle apparatus 19 based on a plurality of vehicle apparatus setting parameters 152 corresponding to the user 15 and the integration setting data 111. Moreover, the vehicle apparatus 19 can comprise an audio playback device or an air condition device. Additionally, the control module 14 can be a microcontroller or a vehicle computer.

Using the audio playback device as an example, the vehicle apparatus setting parameter 152 can comprise a record of the preferred audio content or a view class of the user 15. The integration setting data 111 further comprises priority information. The control module 14 decides a playback setting parameter to set up the audio playback device based on the priority information and vehicle apparatus setting parameters 152 of a plurality of users 15. Or the control module 14 can sieve the content of multimedia played by the audio playback device based on the priority information and view classes of a plurality of users 15.

Using the air condition device as the example, the vehicle apparatus setting parameter 152 comprises a preferred temperature record of the user, and the integration setting data comprises user weighted information. Therefore, the control module decides a temperature setting parameter to set up the air condition device based on the user weighted information and the preferred temperature record of a plurality of users 15.

Figure 2:
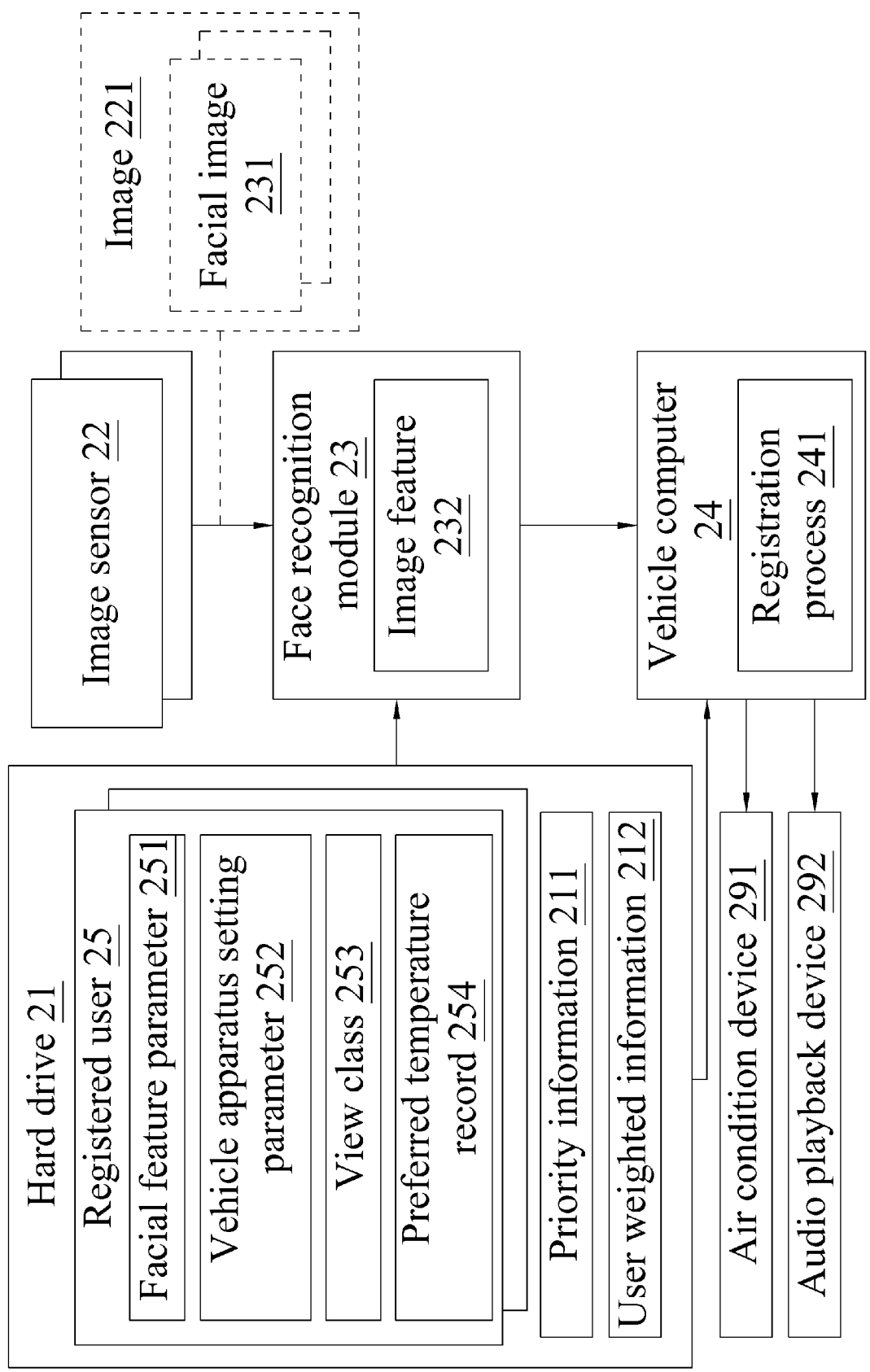
FIG. 2 is the second block diagram of a vehicle apparatus control system according to an embodiment of the present invention.

Please refer to FIG. 2 that is the second block diagram of a vehicle apparatus control system according to an embodiment of the present invention. As shown, the vehicle apparatus control system comprises a hard drive 21, a plurality of image sensors 22, a face recognition module 23, and a vehicle computer 24. The hard drive 21 saves facial feature parameters 251 of a plurality of registered users 25, the record of preferred audio content 252, the view class 253, the preferred temperature record 254, a priority information 211, and a user weighted information 212. A plurality of image capturing modules 22 captures the image 221 of passengers on different seats in the vehicle. The face recognition module 23 detects the facial images 231 from the different images 221 separately to confirm passengers on the different seats in the vehicle. If there is the facial image 231 in the image 221, it shows that there is a passenger on the seat. Therefore, the face recognition module 23 further extracts the image feature 232 of the facial image 231 and compares the image feature 232 and a plurality of facial feature parameters 251 saved in the hard drive 21 to recognize whether if the facial image 231 is one of the plurality of users 25 registered in the vehicle apparatus control system. If the face recognition module 23 determines that the facial image 231 is not the registered user 25, the facial image 231 will notify the vehicle computer 24 to execute the registration process 241 automatically or remind the passenger in the vehicle to execute the registration process 241 manually.

If the face recognition module 23 recognizes that there are a plurality of registered users 25 in the vehicle based on a plurality of images 221, the vehicle computer 24 sets up the audio playback device 292 based on the record of preferred audio content 252, the view class 253, and the priority information 211 corresponding to a plurality of users 25. The audio playback device 292 can comprise a vehicle television, a broadcasting device, a music playback device, or a CD-ROM playback device. The scope of setting can comprise the display interface of the audio playback device 292, the audio content playback order or the view class. For an example, the priority information 211 records: the order of the view class showing that child is prior to mother and mother is prior to father, the order of display interface showing that father is prior to mother and mother is prior to child, and the order of music playback showing that child is prior to father and father is prior to mother. Therefore, while father, mother and child seat in the vehicle at the same time, the vehicle television sieves the program based on the child's view class and the broadcasting device shows the father's favorite radio menu. While playing music, the order of favorite music played by the music playback device is the child, the father, and the mother.

In addition, if the face recognition module 23 recognizes that there are a plurality of registered users 25 in the vehicle based on a plurality of images 221, the vehicle computer 24 sets up the temperature of the air condition device 291 based on the preferred temperature record 254 and user weighted information 212 corresponding to a plurality of users 25. For an example, preferred temperature of the child and the parent are 24° C. and 27° C. respectively. If the child's weighted information counts for 50% and each of the parent weighted information counts for 25% respectively, then the vehicle computer 24 can set the temperature of the air condition device 291 as 25.5° C. (25.5=24*50%+27*25%+27*50%). If the air condition device 291 is equipped air outlets toward different positions, it can control the wind speed and temperature of different air outlets to allow users in different seats enjoying the preferred temperature based on the average temperature as 25.5° C. In general, the temperature of the front seats is higher because of absorbing more sunlight. The user weighted information 212 can adjust the temperature based on the user's position.

Moreover, in the practice, the hard drive 21 can save a facial emotion parameter. The face recognition module 23 can determine the facial expression of the facial image 231 based on the facial emotion parameter. If the face recognition module 23 determines a user who expresses sleeping look, then the vehicle computer 24 decrease the user's weighted information and resets the air condition device 291. The vehicle computer 24 may skip the user's priority class or view class to reset the vehicle television, the broadcasting device, the music playback device, or CD-ROM playback device.

Figure 3:
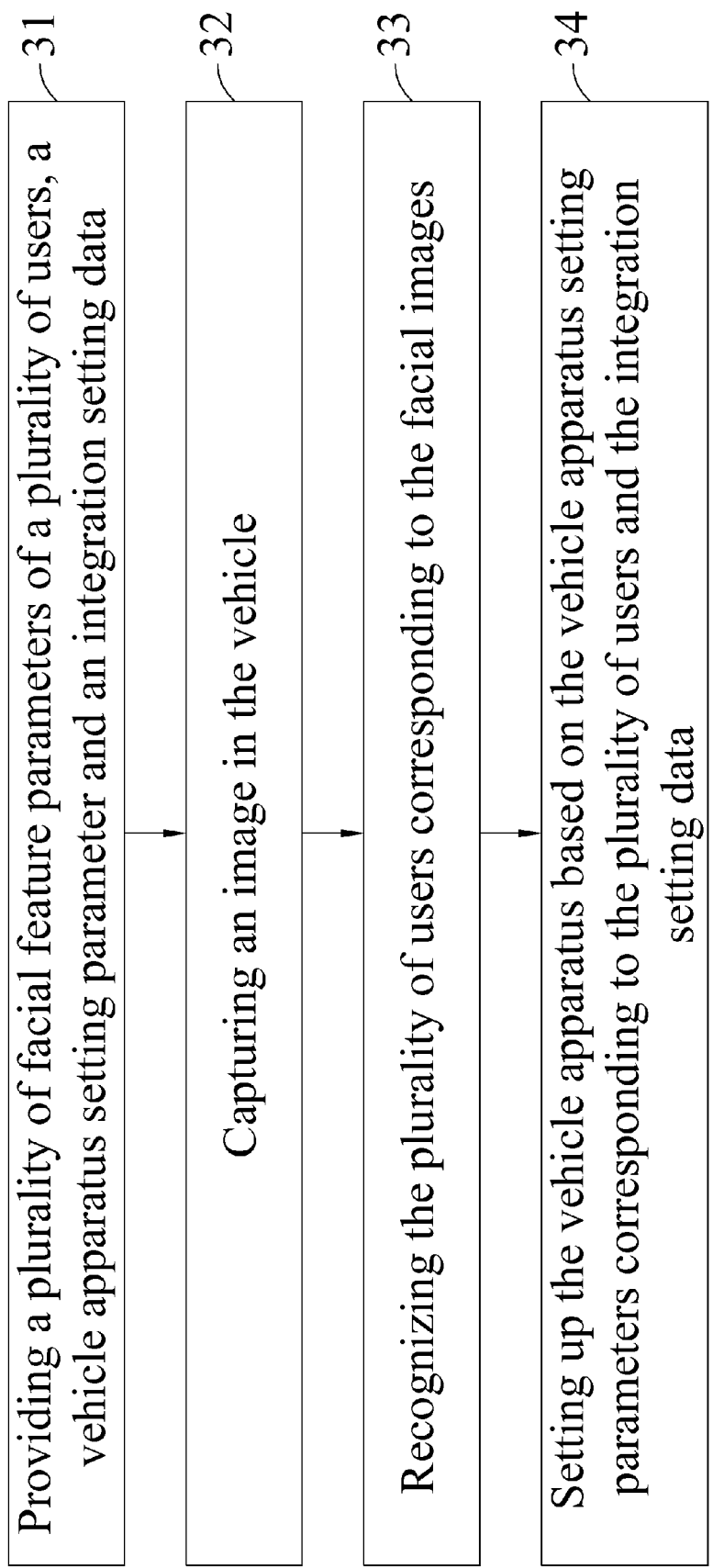
FIG. 3 is the first block diagram of a vehicle apparatus control method according to an embodiment of the present invention.

Please refer to FIG. 3 that is the first block diagram of a vehicle apparatus control method according to an embodiment of the present invention. As shown, the vehicle apparatus control method is used to control at least one vehicle apparatus of a vehicle, which comprises the following steps: The step 31 is to provide a plurality of facial feature parameters of a plurality of users, a vehicle apparatus setting parameter and an integration setting data; The step 32 is to capture an image in the vehicle and at least one or more charge-coupled devices (CCD), complementary metal-oxide-semiconductors (CMOS) or other image sensors with similar functions can be used to capture the images. The step 33 is to detect a plurality of facial images from the image and recognize the plurality of users corresponding to the facial images based on the plurality of facial feature parameters. If there is only one image is captured in the step 32, a plurality of facial images in the single image is detected. On the other hand, if images are captured from each seat in the step 32, the facial image corresponding to each image will be detected in the step 33. The step 34 is to set up the vehicle apparatus based on the vehicle apparatus setting parameters corresponding to the plurality of users and the integration setting data.

Figure 4:
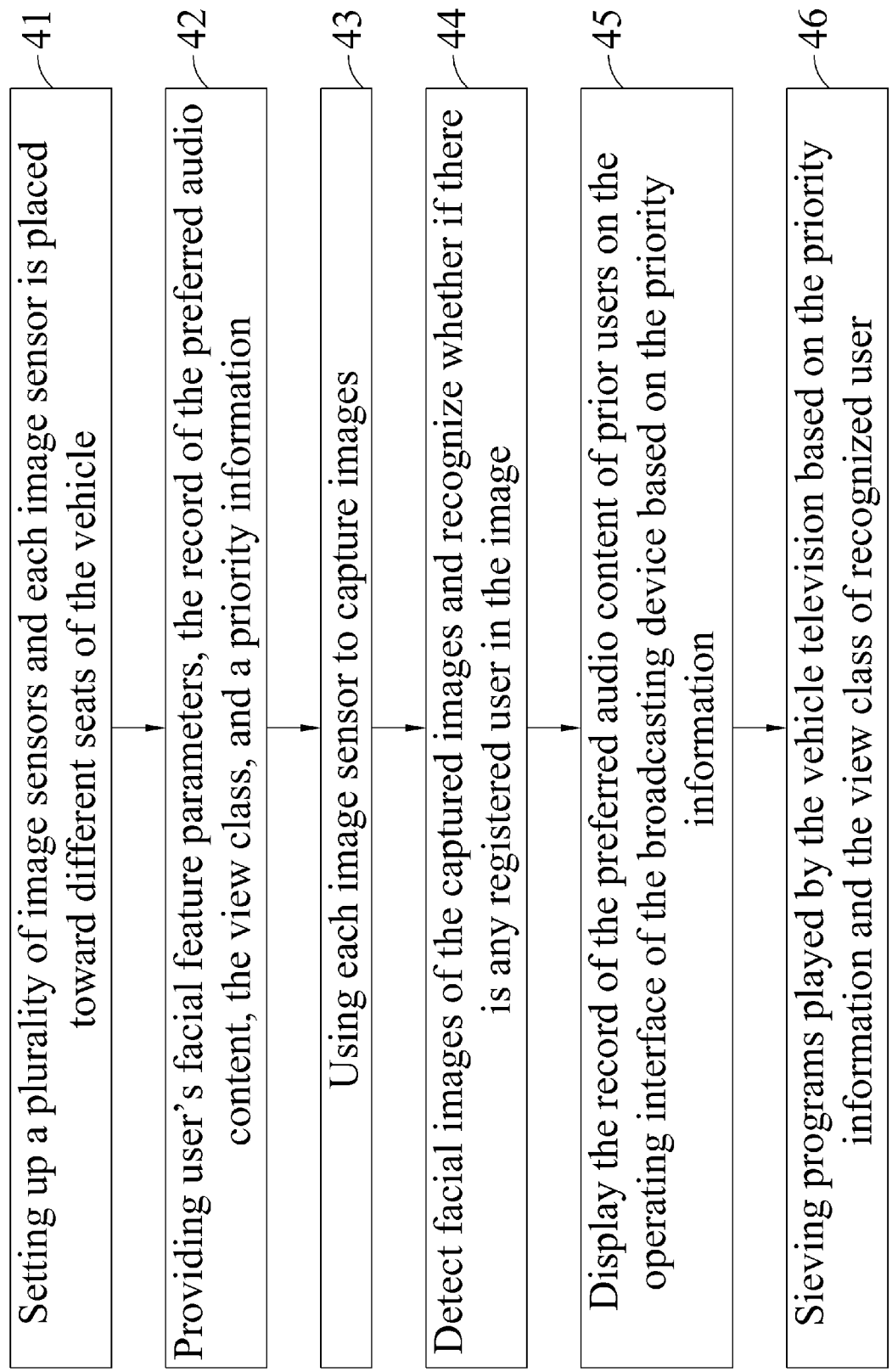
FIG. 4 is the second block diagram of a vehicle apparatus control method according to an embodiment of the present invention.

Please refer to FIG. 4 that is the second block diagram of a vehicle apparatus control method according to an embodiment of the present invention. As shown, the vehicle apparatus control method is used to control the vehicle television and broadcasting device of a vehicle, which comprises the following steps: The step 41 is to set up a plurality of image sensors and each image sensor is placed toward different seats of the vehicle to capture images of the passengers at different seats. The step 42 is to provide facial feature parameters of a plurality of registered users, the record of the preferred audio content and the view class of users, and priority information. The step 43 is to use each image sensor to capture images. The step 44 is to detect facial images of the captured images and extract the facial feature parameters of the facial images to recognize whether if there is any registered user in the image by comparing the facial feature parameters mentioned above. The step 45 is to activate the broadcasting device and display the record of the preferred audio content of prior users on the operating interface of the broadcasting device. The step 46 is to activate the vehicle television and sieve programs played by the vehicle television based on the priority information and the view class of recognized user. For an example, if the priority information records that the child is the first priority and recognizes that there are children who only can watch programs in general class, the vehicle television only can play programs in general class.

Figure 5:
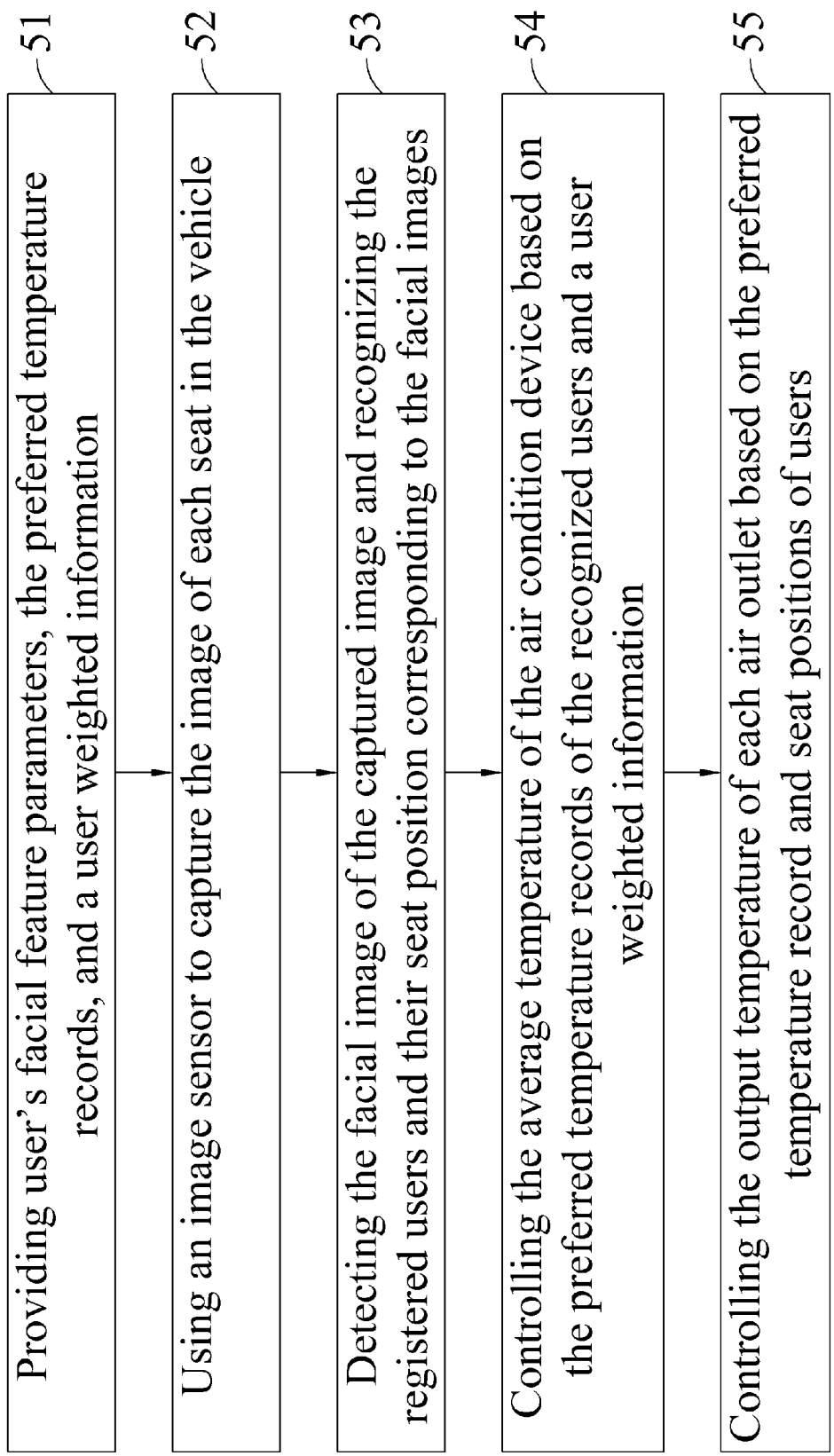
FIG. 5 is the third block diagram of a vehicle apparatus control method according to an embodiment of the present invention.

Please also refer to FIG. 5 that is the third block diagram of a vehicle apparatus control method according to an embodiment of the present invention. The vehicle apparatus control method is used to control the air condition device with many air outlets of a vehicle, which comprises the following steps: The step 51 is to provide facial feature parameters of a plurality of registered users, the preferred temperature records of users, and s user weighted information. The step 52 is to use an image sensor to capture the image of each seat in the vehicle. The step 53 is to detect the facial image of the captured image and recognize the registered users and their seat position corresponding to the facial images based on the facial feature parameters. The step 54 is to control the average temperature of the air condition device based on the preferred temperature records of the recognized users and a user weighted information. The step 55 is to control the output temperature of each air outlet based on the preferred temperature record and seat positions of recognized users.

The detailed description above is used as an example but not a limitation. Thus, the appended claims are intended to encompass within their scope of all such changes and modifications as are within the true spirit and scope of the exemplary embodiment(s) of the present invention.

What is claimed is:

1. An vehicle apparatus control system, used to control at least one vehicle apparatus of a vehicle, comprising:
   a data storage module saving a plurality of facial feature parameters of a plurality of users, a vehicle apparatus setting parameter and an integration setting data;
   at least one image capturing module capturing an image in the vehicle;
   a face recognition module detecting a plurality of facial images of the image and recognizing the plurality of users corresponding to the facial images based on the plurality of facial feature parameters; and
   a control module setting the vehicle apparatus based on the vehicle apparatus setting parameters corresponding to the plurality of users and the integration setting data;
   wherein, the vehicle apparatus comprises an audio playback device or an air conditioning device;
   wherein, the vehicle apparatus setting parameter comprises a view class and the integration setting data comprises a priority information, and the view class defines a viewing sequence of the plurality of the users, and the control module decides a play back sequence of multimedia played by the audio playback device based on the priority information and the viewing sequence of the plurality of the users;
   wherein, the vehicle apparatus setting parameter comprises a preferred temperature record of the user and the integration setting data comprises a user weighted information, and the user weighted information defines a weight of each of the users;
   wherein, the control module decides a temperature degree by product of the weight of each of the users and the preferred temperature record of each the corresponding user.

2. A method of vehicle apparatus control system, used to control at least one vehicle apparatus of a vehicle, comprising the following steps:
   providing a plurality of facial feature parameters of a plurality of users, a vehicle apparatus setting parameter and an integration setting data;
   capturing an image in the vehicle;
   detecting a plurality of facial images from the image and recognizing the plurality of users corresponding to the facial images based on the plurality of facial feature parameters; and setting up the vehicle apparatus based on the vehicle apparatus setting parameters corresponding to the plurality of users and the integration setting data;

wherein, the vehicle apparatus comprises an audio playback device or an air conditioning device:

wherein, the vehicle apparatus setting parameter comprises a view class and the integration setting data comprises a priority information, and the view class defines a viewing sequence of the plurality of the users, and the control module decides a play back sequence of multimedia played by the audio playback device based on the priority information and the viewing sequence of the plurality of the users;

wherein, the vehicle apparatus setting parameter comprises a preferred temperature record of the user and the integration setting data comprises a user weighted information, and the user weighted information defines a weight of each of the users;

wherein, the control module decides a temperature degree by product of the weight of each of the users and the preferred temperature record of each the corresponding user.

* * * * *